United States Patent
Zhou et al.

(10) Patent No.: US 11,838,937 B2
(45) Date of Patent: Dec. 5, 2023

(54) COMPUTATION DELAY FOR APERIODIC CHANNEL STATE INFORMATION BEAM SWITCHING LATENCY

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 17/448,599

(22) Filed: Sep. 23, 2021

(65) Prior Publication Data

US 2022/0141839 A1 May 5, 2022

Related U.S. Application Data

(60) Provisional application No. 63/198,688, filed on Nov. 4, 2020.

(51) Int. Cl.
| | |
|---|---|
| *H04W 72/54* | (2023.01) |
| *H04L 5/00* | (2006.01) |
| *H04W 72/044* | (2023.01) |
| *H04W 72/1263* | (2023.01) |
| *H04W 72/23* | (2023.01) |

(52) U.S. Cl.
CPC ........... *H04W 72/54* (2023.01); *H04L 5/0051* (2013.01); *H04W 72/046* (2013.01); *H04W 72/1263* (2013.01); *H04W 72/23* (2023.01)

(58) Field of Classification Search
CPC .............. H04W 72/54; H04W 72/046; H04W 72/1263; H04W 72/23; H04L 5/0051; H04L 5/0023; H04L 5/005; H04L 5/0053; H04B 7/0695; H04B 7/0617
See application file for complete search history.

(56) References Cited

U.S. PATENT DOCUMENTS

| | | | | |
|---|---|---|---|---|
| 2021/0099223 A1* | 4/2021 | Zhang | ................ | H04B 7/0877 |
| 2021/0320755 A1* | 10/2021 | Faxer | .................... | H04L 1/1896 |
| 2022/0007406 A1* | 1/2022 | Matsumura | ....... | H04W 72/1273 |

* cited by examiner

*Primary Examiner* — Kiet Tang
(74) *Attorney, Agent, or Firm* — Harrity & Harrity, LLP

(57) ABSTRACT

Various aspects of the present disclosure generally relate to wireless communication. In some aspects, a user equipment (UE) may receive downlink control information (DCI) that schedules an aperiodic channel state information reference signal (CSI-RS) report. The UE may determine, based at least in part on the DCI, a time duration between an end of the DCI and a start of a communication on a physical uplink shared channel that includes the aperiodic CSI-RS report. The time duration may be based at least in part on an aperiodic CSI beam switch latency threshold. The UE may generate the aperiodic CSI-RS report based at least in part on a CSI-RS measurement. The UE may transmit the aperiodic CSI-RS report based at least in part on the DCI associated with the time duration. Numerous other aspects are provided.

30 Claims, 9 Drawing Sheets

COMPUTATION DELAY FOR APERIODIC CHANNEL STATE INFORMATION BEAM SWITCHING LATENCY

CROSS-REFERENCE TO RELATED APPLICATION

This Patent Applications claims priority to U.S. Provisional Patent Application No. 63/198,688, filed on Nov. 4, 2020, entitled "COMPUTATION DELAY FOR APERIODIC CHANNEL STATE INFORMATION BEAM SWITCHING LATENCY," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for considering computation delay for aperiodic channel state information beam switching latency.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication performed by a user equipment (UE) includes receiving downlink control information (DCI) that schedules an aperiodic channel state information reference signal (CSI-RS) report and determining, based at least in part on the DCI, a time duration between an end of the DCI and a start of a communication on a physical uplink shared channel (PUSCH) that includes the aperiodic CSI-RS report. The time duration may be based at least in part on an aperiodic CSI beam switch latency threshold. The method may include generating the aperiodic CSI-RS report based at least in part on a CSI-RS measurement and transmitting the aperiodic CSI-RS report based at least in part on the DCI associated with the time duration.

In some aspects, a method of wireless communication performed by a base station includes determining a time duration between an end of DCI to be received by a UE and a start of a communication on a PUSCH that includes an aperiodic CSI-RS report to be transmitted by the UE, based at least in part on an aperiodic CSI beam switch latency threshold. The method may include transmitting the DCI, where the DCI schedules the aperiodic CSI-RS report based at least in part on the time duration, and receiving the aperiodic CSI-RS report based at least in part on the DCI associated with the time duration.

In some aspects, a UE for wireless communication includes a memory and one or more processors coupled to the memory, the one or more processors configured to receive DCI that schedules an aperiodic CSI-RS report and determine, based at least in part on the DCI, a time duration between an end of the DCI and a start of a communication on a PUSCH that includes the aperiodic CSI-RS report. The time duration may be based at least in part on an aperiodic CSI beam switch latency threshold. The one or more processors may be configured to generate the aperiodic CSI-RS report based at least in part on a CSI-RS measurement and transmit the aperiodic CSI-RS report based at least in part on the DCI associated with the time duration.

In some aspects, a base station for wireless communication includes a memory and one or more processors coupled to the memory, the one or more processors configured to determine a time duration between an end of DCI to be received by a UE and a start of a communication on a PUSCH that includes an aperiodic CSI-RS report to be transmitted by the UE, based at least in part on an aperiodic CSI beam switch latency threshold. The one or more processors may be configured to transmit the DCI, where the DCI schedules the aperiodic CSI-RS report based at least in part on the time duration, and receive the aperiodic CSI-RS report based at least in part on the DCI associated with the time duration.

In some aspects, a non-transitory computer-readable medium storing a set of instructions for wireless communication includes one or more instructions that, when executed by one or more processors of a UE, cause the UE to receive DCI that schedules an aperiodic CSI-RS report; determine, based at least in part on the DCI, a time duration between an end of the DCI and a start of a communication on a PUSCH that includes the aperiodic CSI-RS report, where the time duration is based at least in part on an aperiodic CSI beam switch latency threshold; generate the aperiodic CSI-RS report based at least in part on a CSI-RS measurement; and transmit the aperiodic CSI-RS report based at least in part on the DCI associated with the time duration.

In some aspects, a non-transitory computer-readable medium storing a set of instructions for wireless communication includes one or more instructions that, when executed by one or more processors of a base station, cause the base station to determine a time duration between an end of DCI to be received by a UE and a start of a communication on a PUSCH that includes an aperiodic CSI-RS report to be transmitted by the UE, based at least in part on an aperiodic CSI beam switch latency threshold; transmit the DCI, where the DCI schedules the aperiodic CSI-RS report based at least in part on the time duration; and receive the aperiodic CSI-RS report based at least in part on the DCI associated with the time duration.

In some aspects, an apparatus for wireless communication includes means for receiving DCI that schedules an aperiodic CSI-RS report; means for determining, based at least in part on the DCI, a time duration between an end of the DCI and a start of a communication on a PUSCH that includes the aperiodic CSI-RS report, where the time duration is based at least in part on an aperiodic CSI beam switch latency threshold; means for generating the aperiodic CSI-RS report based at least in part on a CSI-RS measurement; and means for transmitting the aperiodic CSI-RS report based at least in part on the DCI associated with the time duration.

In some aspects, an apparatus for wireless communication includes means for determining a time duration between an end of DCI to be received by a UE and a start of a communication on a PUSCH that includes an aperiodic CSI-RS report to be transmitted by the UE, based at least in part on an aperiodic CSI beam switch latency threshold; means for transmitting the DCI, where the DCI schedules the aperiodic CSI-RS report based at least in part on the time duration; and means for receiving the aperiodic CSI-RS report based at least in part on the DCI associated with the time duration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
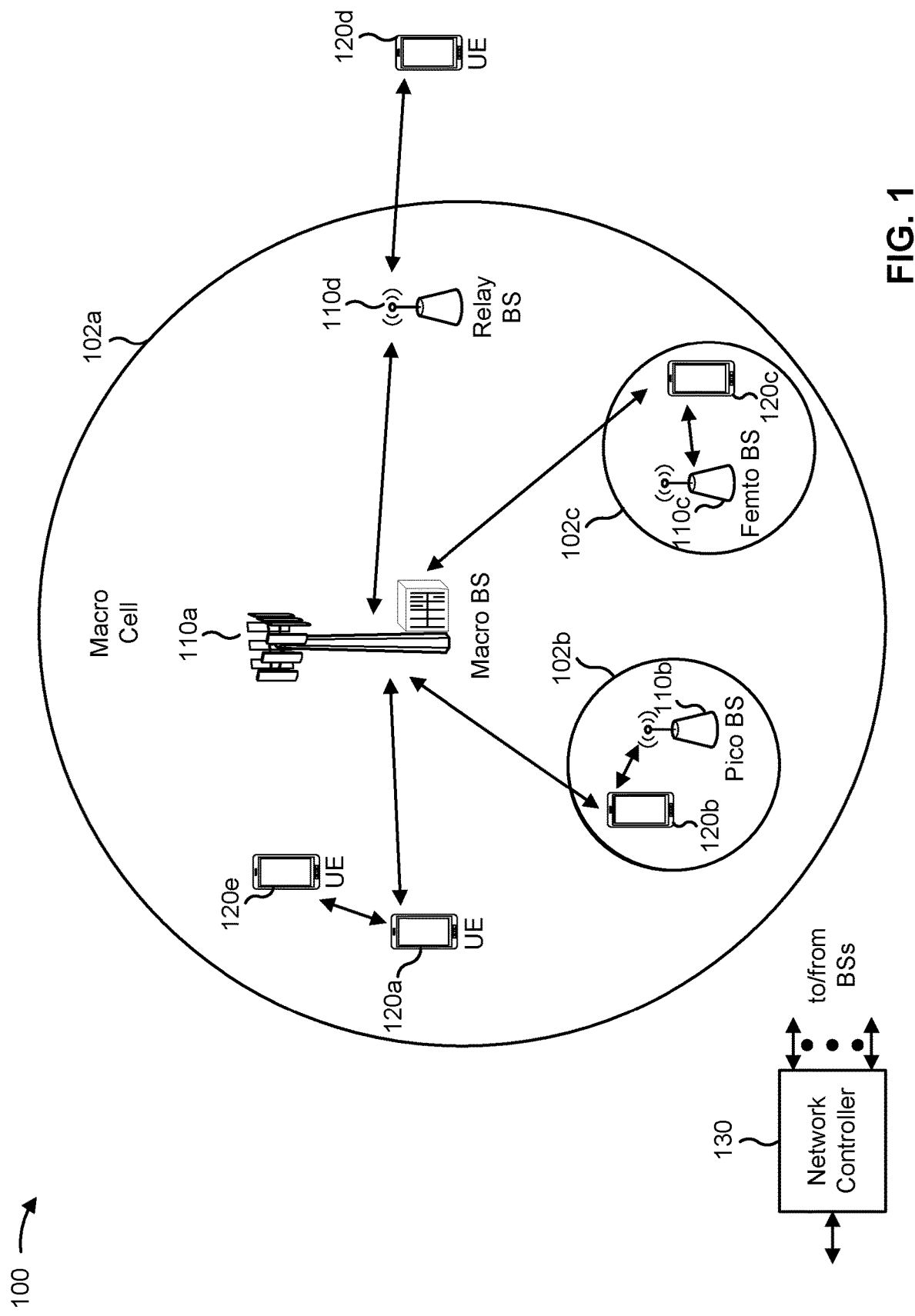
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
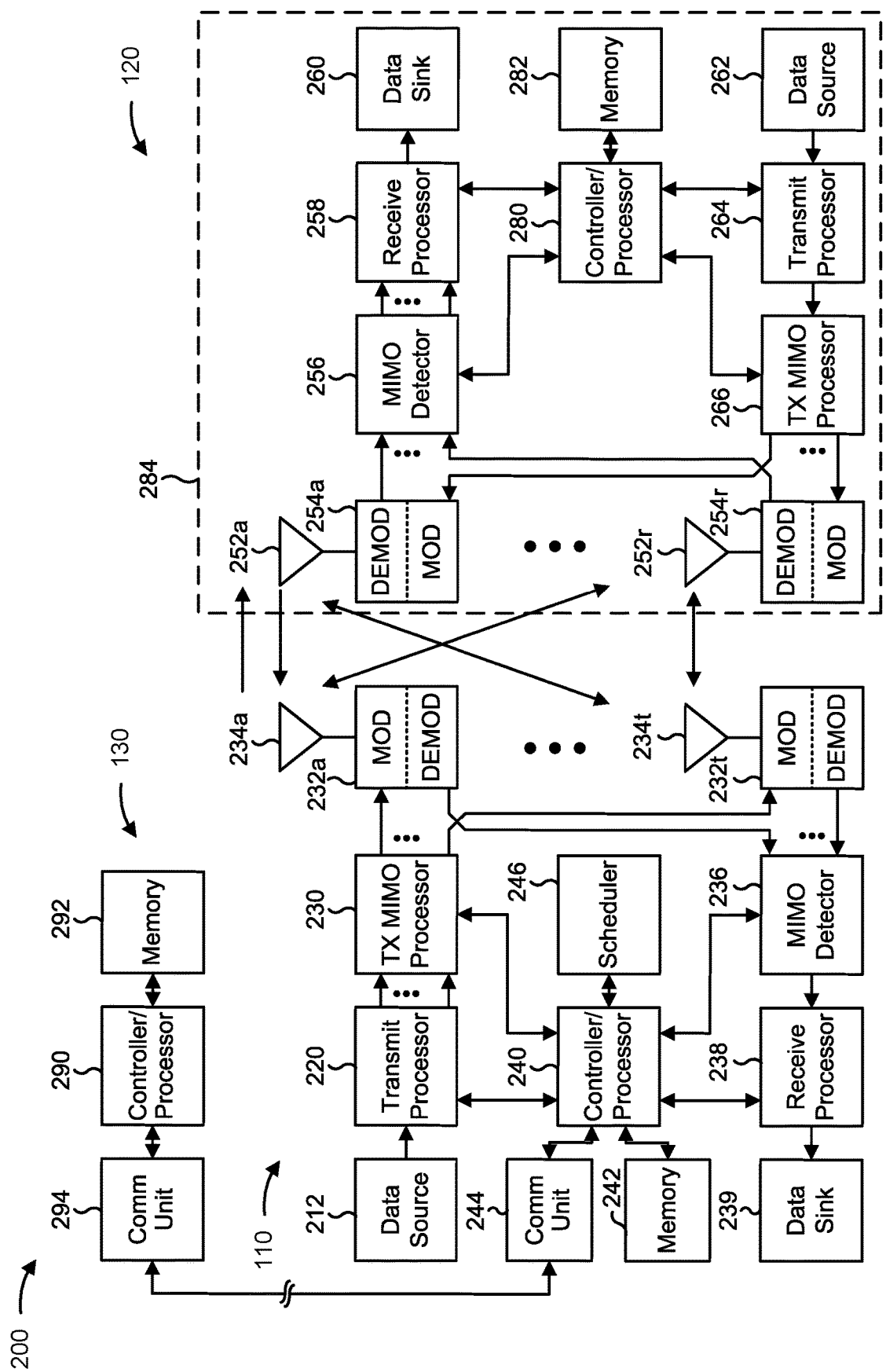
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-9).

Controller/processor 240 of base station 110, controller/processor 280 of UE 120, and/or any other component(s) of FIG. 2 may perform one or more techniques associated with considering computation delay for aperiodic channel state information beam switching latency, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 includes means for receiving downlink control information (DCI) that schedules an aperiodic channel state information reference signal (CSI-RS) report; means for determining, based at least in part on the DCI, a time duration between an end of the DCI and a start of a communication on a physical uplink shared channel (PUSCH) that includes the aperiodic CSI-RS report, where the time duration is based at least in part on an aperiodic CSI beam switch latency threshold; means for generating the aperiodic CSI-RS report based at least in part on a CSI-RS measurement; and/or means for transmitting the aperiodic CSI-RS report based at least in part on the DCI associated with the time duration. The means for UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, UE 120 includes means for determining that the aperiodic CSI beam switch latency threshold is equal to a first beam switch timing value, after reporting the first beam switch timing value. In some aspects, UE 120 includes means for determining that the aperiodic CSI beam switch latency threshold is equal to a first beam switch timing value, after reporting the first beam switch timing value. In some aspects, UE 120 includes means for determining the aperiodic CSI beam switch latency threshold from stored configuration information. In some aspects, UE 120 includes means for receiving the aperiodic CSI beam switch latency threshold via a radio resource control (RRC) message, a medium access control (MAC) control element (MAC CE), or DCI. In some aspects, UE 120 includes means for transmitting a recommended aperiodic CSI beam switch latency threshold.

In some aspects, UE 120 includes means for receiving, from a base station, a higher layer parameter for enabling beam switch timing, where the beam switch timing value is 224 or 336 symbols; or means for transmitting a beam switch timing value to the base station, where the higher layer parameter indicates whether the base station is using the beam switch timing value.

In some aspects, UE 120 includes means for transmitting a beam switch timing value to a base station, wherein the beam switch timing value is 224 or 336 symbols; or means for determining that a higher layer parameter for enabling beam switch timing has not been received from the base station, where the higher layer parameter indicates whether the base station is using the beam switch timing value.

In some aspects, UE 120 includes means for transmitting a first beam switch timing value, where the first beam switch timing value is 14, 28, or 48 symbols, and refraining from transmitting a second beam switch timing value, wherein the second beam switch timing value is 224 or 336 symbols.

In some aspects, base station 110 includes means for determining a time duration between an end of DCI to be received by a UE and a start of a communication on a PUSCH that includes an aperiodic CSI-RS report to be transmitted by the UE, based at least in part on an aperiodic CSI beam switch latency threshold; means for transmitting the DCI, where the DCI schedules the aperiodic CSI-RS report based at least in part on the time duration; and/or means for receiving the aperiodic CSI-RS report based at least in part on the DCI associated with the time duration. The means for base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, base station 110 includes means for receiving a first beam switch timing value, where the aperiodic CSI beam switch latency threshold is equal to the first beam switch timing value. In some aspects, base station 110 includes means for receiving a first beam switch timing value and a second beam switch timing value, where the aperiodic CSI beam switch latency threshold is equal to the second beam switch timing value based on scheduling an aperiodic CSI-RS in a CSI-RS resource set configured with repetition. In some aspects, base station 110 includes means for transmitting the aperiodic CSI beam switch latency threshold to the UE via an RRC message, a MAC CE, or DCI. In some aspects, base station 110 includes means for transmitting a recommended aperiodic CSI beam switch latency threshold.

In some aspects, base station 110 includes means for transmitting a higher layer parameter for enabling beam switch timing after receiving a beam switch timing value from the UE, where the beam switch timing value is 224 or 336 symbols, and wherein the higher layer parameter indicates whether the base station is using the beam switch timing value.

In some aspects, base station 110 includes means for refraining from transmitting a higher layer parameter for enabling beam switch timing after receiving a beam switch timing value from the UE, where the beam switch timing value is 224 or 336 symbols.

In some aspects, base station 110 includes means for receiving, from the UE, a first beam switch timing value, where the first beam switch timing value is 14, 28, or 48 symbols, and not receiving a second beam switch timing value, where the second beam switch timing value is 224 or 336 symbols.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
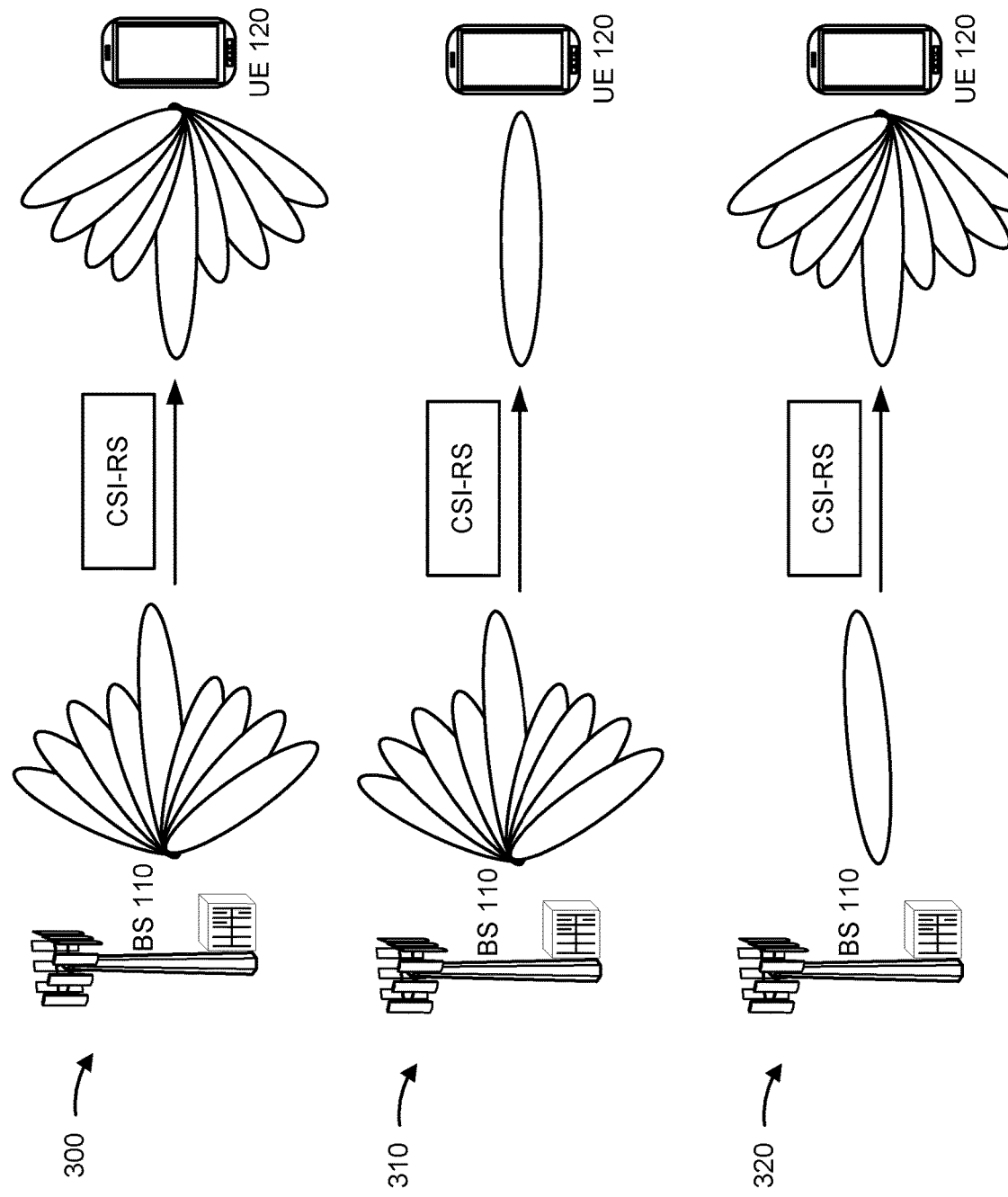
FIG. 3 is a diagram illustrating examples of channel state information reference signal (CSI-RS) beam management procedures, in accordance with the present disclosure.

FIG. 3 is a diagram illustrating examples 300, 310, and 320 of CSI-RS beam management procedures, in accordance with the present disclosure. As shown in FIG. 3, examples 300, 310, and 320 include a UE 120 in communication with a base station 110 in a wireless network (e.g., wireless network 100). However, the devices shown in FIG. 3 are provided as examples, and the wireless network may support communication and beam management between other devices (e.g., between a UE 120 and a base station 110 or TRP, between a mobile termination node and a control node, between an integrated access and backhaul (IAB) child node and an IAB parent node, between a scheduled node and a scheduling node, and/or the like). In some aspects, UE 120 and base station 110 may be in a connected state (e.g., an RRC connected state).

As shown in FIG. 3, example 300 may include a base station 110 and a UE 120 communicating to perform beam management using CSI-RSs. Example 300 depicts a first beam management procedure (e.g., P1 CSI-RS beam management). The first beam management procedure may be referred to as a beam selection procedure, an initial beam acquisition procedure, a beam sweeping procedure, a cell search procedure, a beam search procedure, and/or the like. As shown in FIG. 3 and example 300, CSI-RSs may be configured to be transmitted from base station 110 to UE 120. The CSI-RSs may be configured to be periodic (e.g., using RRC signaling and/or the like), semi-persistent (e.g., using MAC CE signaling), and/or aperiodic (e.g., using DCI).

The first beam management procedure may include base station 110 performing beam sweeping over multiple transmit (Tx) beams. Base station 110 may transmit a CSI-RS using each transmit beam for beam management. To enable UE 120 to perform receive (Rx) beam sweeping, the base station may use a transmit beam to transmit (e.g., with repetitions) each CSI-RS at multiple times within the same RS resource set so that UE 120 can sweep through receive beams in multiple transmission instances. For example, if base station 110 has a set of N transmit beams and UE 120 has a set of M receive beams, the CSI-RS may be transmitted on each of the N transmit beams M times so that UE 120 may receive M instances of the CSI-RS per transmit beam. In other words, for each transmit beam of base station 110, UE 120 may perform beam sweeping through the receive beams of UE 120. As a result, the first beam management procedure may enable UE 120 to measure a CSI-RS on different transmit beams using different receive beams to support selection of base station 110 transmit beams/UE 120 receive beam(s) beam pair(s). UE 120 may report the measurements to base station 110 to enable base station 110 to select one or more beam pair(s) for communication between base station 110 and UE 120. While example 300 has been described in connection with CSI-RSs, the first beam management process may also use synchronization signal blocks for beam management in a similar manner as described above.

As shown in FIG. 3, example 310 may include a base station 110 and a UE 120 communicating to perform beam management using CSI-RSs. Example 310 depicts a second beam management procedure (e.g., P2 CSI-RS beam management). The second beam management procedure may be referred to as a beam refinement procedure, a base station beam refinement procedure, a TRP beam refinement procedure, a transmit beam refinement procedure, and/or the like. As shown in FIG. 3 and example 310, CSI-RSs may be configured to be transmitted from base station 110 to UE 120. The CSI-RSs may be configured to be aperiodic (e.g., using DCI and/or the like). The second beam management procedure may include base station 110 performing beam sweeping over one or more transmit beams. The one or more transmit beams may be a subset of all transmit beams associated with base station 110 (e.g., determined based at least in part on measurements reported by UE 120 in connection with the first beam management procedure). Base station 110 may transmit a CSI-RS using each transmit beam of the one or more transmit beams for beam management. UE 120 may measure each CSI-RS using a single (e.g., a same) receive beam (e.g., determined based at least in part on measurements performed in connection with the first beam management procedure). The second beam management procedure may enable base station 110 to select a best transmit beam based at least in part on measurements of the CSI-RSs (e.g., measured by UE 120 using the single receive beam) reported by UE 120.

As shown in FIG. 3, example 320 depicts a third beam management procedure (e.g., P3 CSI-RS beam management). The third beam management procedure may be referred to as a beam refinement procedure, a UE beam refinement procedure, a receive beam refinement procedure, and/or the like. As shown in FIG. 3 and example 320, one or more CSI-RSs may be configured to be transmitted from base station 110 to UE 120. The CSI-RSs may be configured to be aperiodic (e.g., using DCI). The third beam management process may include base station 110 transmitting the one or more CSI-RSs using a single transmit beam (e.g., determined based at least in part on measurements reported by UE 120 in connection with the first beam management procedure and/or the second beam management procedure). To enable UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with UE 120 (e.g., determined based at least in part on measurements performed in connection with the first beam management procedure and/or the second beam management procedure). The third beam management procedure may enable base station 110 and/or UE 120 to select a best receive beam based at least in part on reported measurements received from UE 120 (e.g., of the CSI-RS of the transmit beam using the one or more receive beams).

As indicated above, FIG. 3 is provided as an example of beam management procedures. Other examples of beam management procedures may differ from what is described with respect to FIG. 3. For example, UE 120 and base station 110 may perform the third beam management procedure before performing the second beam management procedure, and/or UE 120 and base station 110 may perform a similar beam management procedure to select a UE transmit beam.

A UE may utilize a certain timing for switching beams for receiving aperiodic CSI-RS, and the UE may report such a timing to a base station. For example, the UE may report a beam switch timing value of 14, 28, or 48 symbols. In some circumstances, the UE may report an increased beam switch timing value of 224 or 336 symbols. The larger values of 224 and 336 symbols enable the UE to wake up an idle antenna panel to receive the aperiodic CSI-RS. A beam switch timing value may indicate a minimum time gap (for example, a minimum quantity of symbols) between a DCI triggering aperiodic CSI-RS and the corresponding aperiodic CSI-RS transmission for the UE to apply a downlink beam indicated in the DCI to receive the aperiodic CSI-RS. However, the UE may be configured to report the increased beam switch timing value for aperiodic CSI-RS under conflicting conditions. The UE may be configured to apply, under a first condition, the increased beam switch timing value of 224 or 336 symbols to the aperiodic CSI-RS when a high layer repetition parameter is set as "ON" for the aperiodic CSI-RS. The UE may be configured to apply, under a second condition, the increased beam switch timing value of 224 or 336 symbols to the aperiodic CSI-RS without a high layer tracking reference signal (TRS) information (TRS-Info) parameter being received at the UE, with the high layer repetition parameter is set as "ON" for the aperiodic CSI-RS. As a result, the UE may generate an error when attempting to apply the increased beam switch timing value due to the conflicting conditions. For example, the UE may generate an error when attempting to apply the increased beam switch timing value when the high layer repetition parameter is set as "OFF", when the high layer TRS information parameter is received at the UE, and so on. Since the increased beam switch timing value may be beneficial to the UE, by providing an increased beam switch timing, the error generated at the UE due to the conflicting conditions may negatively affect a performance of the UE.

In some circumstances, the UE may be configured to apply the increased beam switch timing value (or an increased aperiodic CSI-RS beam switch latency threshold) when specific conditions are satisfied. The UE may be configured to apply the increased beam switch timing value based at least in part on whether TRS information is configured for the UE or whether a repetition is associated with the aperiodic CSI-RS. The UE may apply the increased beam switch timing value when the TRS configuration is not configured for the UE and the repetition is "ON" for the aperiodic CSI-RS. The increased beam switch timing value may be 224 or 336 symbols. The UE may not apply the increased beam switch timing value when the TRS configuration is configured for the UE. The UE may not apply the increased beam switch timing value when the TRS configuration is not configured for the UE and the repetition is off for the aperiodic CSI-RS. The UE may not apply the increased beam switch timing value when the TRS configuration is not configured for the UE and the repetition is not configured for the aperiodic CSI-RS. In some circumstances, when the UE may not apply the increased beam switch timing value, the UE may instead apply a beam switch timing value that may be 14, 28, or 48 symbols.

In some circumstances, the described techniques can be used to define a UE behavior with respect to the increased beam switch timing value for aperiodic CSI-RS. The UE may be configured to apply the increased beam switch timing value when specific conditions are met, and the UE may otherwise apply the reduced switch timing value. The increased beam switch timing value may be beneficial to specific UEs due to an increased beam switch timing for the UE associated with the increased beam switch timing value. In other words, the increased beam switch timing may provide the UE with increased time to apply an indicated downlink beam in DCI.

Figure 4:
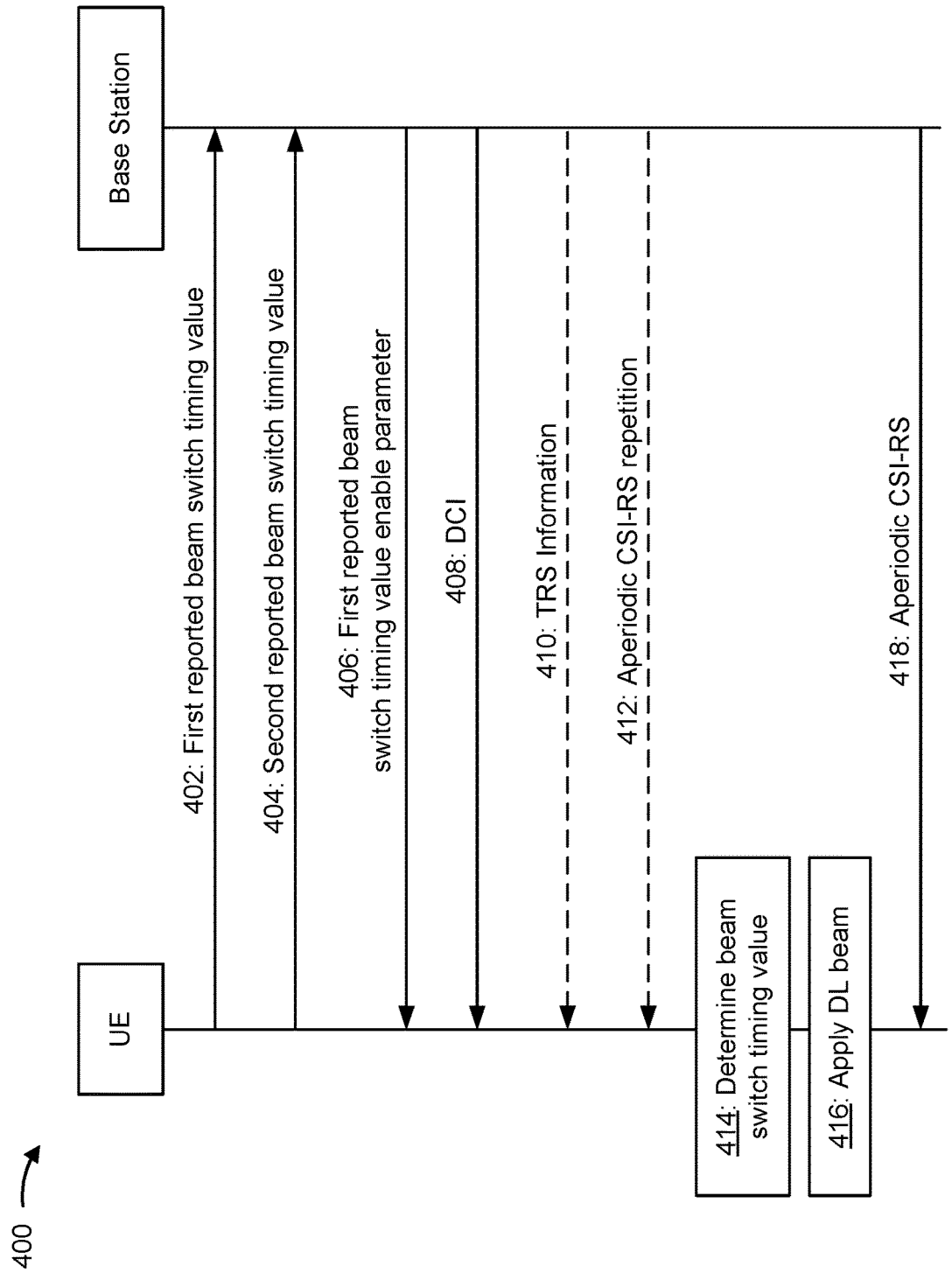
FIG. 4 is a diagram illustrating an example associated with beam switch timing for aperiodic CSI-RSs, in accordance with the present disclosure.

FIG. 4 is a diagram illustrating an example 400 associated with beam switch timing for aperiodic CSI-RSs, in accordance with the present disclosure. As shown in FIG. 4, example 400 includes communication between a UE (for example, UE 120) and a base station (for example, base station 110). In some aspects, the UE and the base station may be included in a wireless network such as wireless network 100. The UE and the base station may communicate on a wireless access link, which may include an uplink and a downlink.

In a first operation 402, the UE may transmit a first reported beam switch timing value to the base station, which may be the reduced beam switch timing value describe above. The first reported beam switch timing value may be included in a beam switch timing (beamSwitchTiming) parameter transmitted from the UE to the base station. The first reported beam switch timing value may correspond to a minimum quantity of OFDM symbols between a DCI triggering aperiodic CSI-RS and a corresponding aperiodic CSI-RS transmission in a CSI resource set. In other words, the first reported beam switch timing value may indicate an aperiodic CSI-RS beam switch latency threshold, which may correspond to a minimum time gap (in terms of OFDM symbols) between a scheduling DCI and a scheduling aperiodic CSI-RS for the UE to apply an indicated downlink beam in the scheduling DCI. The first reported beam switch timing value may be 14, 28, or 48 symbols. In some aspects, the first reported beam switch timing value may be a value other than 14, 28, or 48 symbols.

In a second operation 404, the UE may transmit a second reported beam switch timing value to the base station. The second reported beam switch timing value may be included in a new beam switch timing parameter transmitted from the UE to the base station. For example, the new beam switch timing parameter may be a Release 16 beam switch timing (beamSwitchTiming-r16) parameter. The second reported beam switch timing value may correspond to a minimum quantity of OFDM symbols between a DCI triggering aperiodic CSI-RS and a corresponding aperiodic CSI-RS transmission in a CSI resource set. In other words, the second reported beam switch timing value may indicate an aperiodic CSI-RS beam switch latency threshold, which may correspond to a minimum time gap (in terms of OFDM symbols) between a scheduling DCI and a scheduling aperiodic CSI-RS for the UE to apply an indicated downlink beam in the scheduling DCI. The second reported beam switch timing value may be 224 or 336 symbols. In some aspects, the second reported beam switch timing value may be a value other than 224 or 336 symbols.

In some aspects, the second reported beam switch timing value may provide the UE with an increased aperiodic CSI-RS beam switch latency threshold as compared to the first reported beam switch timing value. For example, the second reported beam switch timing value may provide the UE with an aperiodic CSI-RS beam switch latency threshold of 224 or 336 symbols, as compared to the first reported beam switch timing value, which may provide the UE with an aperiodic CSI-RS beam switch latency threshold of 14, 28, or 48 symbols. The second reported beam switch timing value may provide the UE with an increased time period to apply the downlink beam indicated in the scheduling DCI, as compared to the first reported beam switch timing value.

In a third operation 406, the UE may receive, from the base station, a high layer parameter that enables the UE to apply the second reported beam switch timing value at the UE. The high layer parameter may be an enableBeamSwitchTiming-r16 parameter. The high layer parameter may enable the UE to use the second reported beam switch timing value of 224 or 336 symbols.

In a fourth operation 408, the base station may transmit a DCI to the UE over a physical downlink control channel (PDCCH). The DCI may be associated with an aperiodic CSI-RS. For example, the DCI may be a scheduling DCI that schedules the aperiodic CSI-RS. The DCI may trigger the aperiodic CSI-RS to be transmitted from the base station to the UE at a later time. Additionally, the DCI may indicate a downlink beam to be applied by the UE. For example, the DCI may indicate the downlink beam to be applied by the UE to receive the aperiodic CSI-RS from the base station.

In a fifth operation 410, the base station may transmit CSI-RS with TRS information configured to the UE. For example, the base station may transmit a TRS-Info parameter to the UE to indicate the TRS information, in which case CSI-RS serves as TRS. The TRS information may be associated with a TRS transmission from the base station to the UE. The TRS transmission may be used for time tracking, frequency tracking, or a path delay spread and Doppler spread. The TRS may be a UE-specific reference signal that is transmitted in four OFDM symbols in two consecutive slots.

In a sixth operation 412, the base station may transmit an aperiodic CSI-RS repetition parameter to the UE. The aperiodic CSI-RS repetition parameter may indicate an aperiodic CSI-RS repetition associated with the aperiodic CSI-RS. In some aspects, the aperiodic CSI-RS repetition parameter may indicate when repetition is set as "ON" for the aperiodic CSI-RS, or the aperiodic CSI-RS repetition parameter may indicate when repetition is set as "OFF" for the aperiodic CSI-RS. In other words, the aperiodic CSI-RS repetition parameter may indicate whether a transmission of the aperiodic CSI-RS is to be repeated by the base station.

In a seventh operation 414, the UE may determine a beam switch timing value based at least in part on whether the TRS information is configured for the UE or whether a repetition is associated with the aperiodic CSI-RS. In other words, the UE may determine the beam switch timing value based at least in part on the TRS information or the aperiodic CSI-RS repetition parameter. The TRS information may nor may not be received at the UE. The aperiodic CSI-RS repetition parameter may or may not be received at the UE. The beam switch timing value may be an actual beam switch timing value to be applied at the UE. The UE may determine that the beam switch timing value corresponds to the first reported beam switch timing value, the second reported beam switch timing value, or both, depending on the TRS information or the aperiodic CSI-RS repetition parameter.

In some aspects, the UE may determine that the beam switch timing value for the aperiodic CSI-RS corresponds to the first reported beam switch timing value when the TRS information is configured for the UE. In other words, for aperiodic CSI-RS with the TRS information configured for the UE, the UE may determine that the beam switch timing value (or an actual applied beam switch latency threshold) corresponds to the first reported beam switch timing value (beamSwitchTiming). In this example, the beam switch timing value may be 14, 28, or 48 symbols, and the aperiodic CSI-RS may serve as the TRS for the UE.

In some aspects, the UE may determine that the beam switch timing value for the aperiodic CSI-RS corresponds to the first reported beam switch timing value when the TRS information is not configured for the UE and the aperiodic CSI-RS repetition is configured as "OFF". In other words, for aperiodic CSI-RS with the TRS information not configured for the UE and the aperiodic CSI-RS repetition set to "OFF", the UE may determine that the beam switch timing value (or an actual applied beam switch latency threshold) corresponds to the first reported beam switch timing value. In this example, the beam switch timing value may be 48 symbols.

Additionally, the aperiodic CSI-RS may be used for beam management. For example, the aperiodic CSI-RS may be used for beam selection and base station beam refinement at the base station. In other words, the base station may select or refine a beam associated with the UE based at least in part on the aperiodic CSI-RS.

In some aspects, the UE may determine that the beam switch timing value for the aperiodic CSI-RS corresponds to the second reported beam switch timing value when the TRS information is not configured for the UE and the aperiodic CSI-RS repetition is configured as "ON". In other words, for aperiodic CSI-RS with the TRS information not configured for the UE and the aperiodic CSI-RS repetition set to "ON", the UE may determine that the beam switch timing value (or an actual applied beam switch latency threshold) corresponds to the second reported beam switch timing value (beamSwitchTiming-r16). In this example, the beam switch timing value may be 224 or 336 symbols.

Additionally, the aperiodic CSI-RS may be used for beam management. For example, the aperiodic CSI-RS may be used for a UE beam refinement. In other words, the UE may refine a beam based at least in part on the aperiodic CSI-RS received from the base station.

In some aspects, the UE may determine that the beam switch timing value for the aperiodic CSI-RS corresponds to the first reported beam switch timing value when the TRS information is not configured for the UE and the aperiodic CSI-RS repetition is not configured for the UE. In other words, for aperiodic CSI-RS with the TRS information configured for the UE, the UE may determine that the beam switch timing value (or an actual applied beam switch latency threshold) corresponds to the first reported beam switch timing value. In this example, the beam switch timing value may be 48 symbols. In some aspects, the aperiodic CSI-RS may serve for CSI feedback purposes. In other words, the UE may generate CSI feedback for transmission to the base station based at least in part on the aperiodic CSI-RS.

In an eighth operation 416, the UE may apply the downlink beam indicated in the DCI. The UE may apply the downlink beam to receive the aperiodic CSI-RS from the base station. The UE may apply the downlink beam in accordance with the beam switch timing value. For example, the UE may apply the downlink beam in accordance with the beam switch timing value of 224 or 336 symbols. Alternatively, the UE may apply the downlink beam in accordance with the beam switch timing value of 14, 28, or 48 symbols.

In a ninth operation 418, the UE may receive the aperiodic CSI-RS from the base station. The UE may receive the aperiodic CSI-RS in accordance with the beam switch timing value. For example, the UE may receive the aperiodic CSI-RS based at least in part on applying the downlink beam indicated in the DCI in accordance with the beam switch timing value. The aperiodic CSI-RS may be transmitted from the base station to the UE in a CSI-RS resource set.

As indicated above, FIG. 4 is provided as an example. Other examples may differ from what is described with regard to FIG. 4.

The UE may include multiple antenna panels that generate beams for transmission or reception. Switching between the beams may involve a computation delay to account for an aperiodic CSI beam switch latency threshold. The computation delay may be indicated by a time duration. The time duration may be a time from an end of a DCI received on a PDCCH to a start of a PUSCH carrying an aperiodic CSI report. The time duration may be referred to as a Z3 CSI computation delay and may be a minimum time for computation delay. To mark a different time measurement, a Z3' delay may be a minimum time from an end of an aperiodic CSI-RS to a start of the PUSCH carrying the aperiodic CSI report.

While a beam switch timing value, such as for beamSwitchTiming, has been 14, 28, or 48 symbols, there is an increased beam switch timing value for Release 16 (e.g., beamSwitchTiming-r16), as described above in connection with FIG. 4. This increased beam switch timing value may be large, such as 224 or 336 symbols. However, the UE does not account for a computation delay when the new beam switch timing value is involved, with this larger latency. If an appropriate computation delay is not enabled, the UE may transmit the aperiodic CSI report later than expected for the base station. If the base station does not successfully receive the aperiodic CSI report, the base station may not have updated CSI information for scheduling communications for the UE. This may lead to degraded communications, which cause the UE and the base station to waste time, power, processing resources, and signaling resources on failed communications and retransmissions.

According to various aspects described herein, a base station may consider a computation delay that may involve a larger beam switch timing value. For example, the base station may determine a time duration associated with the computation delay based at least in part on an aperiodic CSI beam switch latency threshold, which may be based at least in part on which beam switch timing value or values (e.g., beamSwitchTiming, beamSwitchTiming-r16) are reported by the UE. In this way, the UE may have flexibility and sufficient computation time to generate and provide an aperiodic CSI report, even if a larger CSI beam switch latency threshold is involved. This may prevent degraded communications, and the UE and the base station may conserve time, power, processing resources, and signaling resources that would otherwise be consumed by failed communications and retransmissions.

Figure 5:
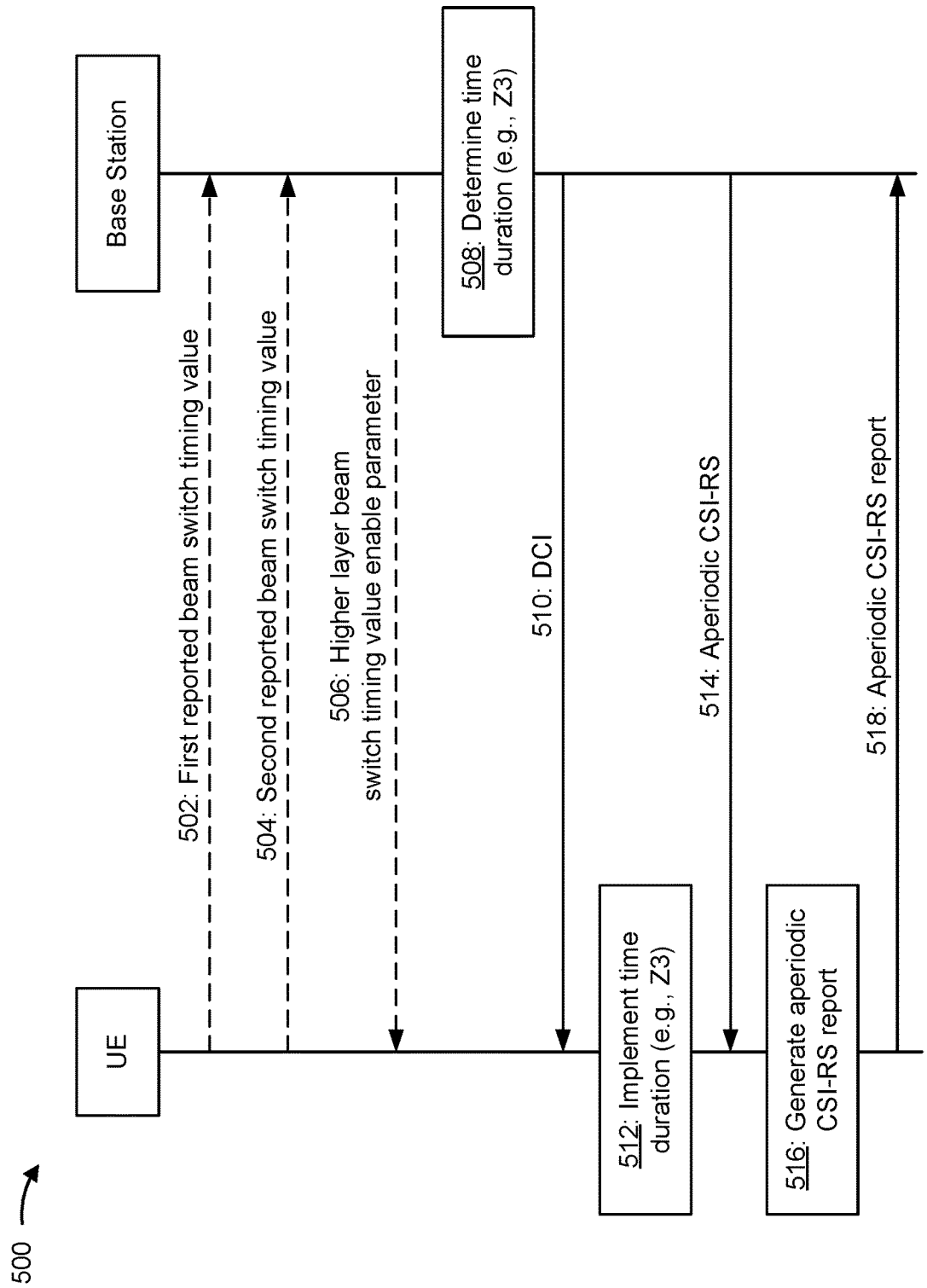
FIG. 5 is a diagram illustrating an example associated with considering computation delay for aperiodic CSI beam switching latency, in accordance with the present disclosure.

FIG. 5 is a diagram illustrating an example 500 associated with considering computation delay for aperiodic CSI beam switching latency, in accordance with the present disclosure. As shown in FIG. 5, example 500 includes communication between a UE (for example, UE 120) and a base station (for example, base station 110). In some aspects, the UE and the base station may be included in a wireless network such as wireless network 100. The UE and the base station may communicate on a wireless access link, which may include an uplink and a downlink.

The base station may determine a time duration (e.g., Z3) for a UE, the time duration being between an end of DCI that the UE receives and a start of an aperiodic CSI report that the UE transmits on a PUSCH. The time duration may account for a computation delay at the UE for processing and preparing an aperiodic CSI report, which may involve a larger beam switch timing value.

The base station may indicate the time duration to the UE in DCI, such that the UE and the base station operate according to the same rule for the time duration. The base station may determine the time duration based at least in part on an aperiodic CSI beam switch latency. In some aspects, the aperiodic CSI beam switch latency threshold may be a fixed value (e.g., 48 symbols) that is obtained from stored configuration information (e.g., according to a standard).

In some aspects, the aperiodic CSI beam switch latency may be based at least in part on whether a first beam switch timing (e.g., beamSwitchTiming) parameter is reported by the UE, and/or a second beam switch timing (e.g., beamSwitchTiming-r16) parameter is reported by the UE. The first beam switch timing may be 14, 28, or 48 symbols, and the second beam switch timing may be 224 or 336 symbols. First operation 502 shows that the first beam switch timing value may be reported by the UE. Second operation 504 shows that the second beam switch timing value may also be reported by the UE.

In some aspects, the aperiodic CSI beam switch latency may also be based at least in part on whether the base station transmits a high layer parameter (e.g., enableBeamSwitchTiming-r16) that enables the UE to apply the second reported beam switch timing value at the UE. In a third operation 506, the base station may optionally transmit the high layer parameter.

In a fourth operation 508, the base station may determine the time duration based at least in part on an aperiodic CSI beam switching latency threshold. For example, the time duration may be a Z3 value, and the Z3 value may be based at least in part on the aperiodic CSI beam switch latency threshold (e.g., $KB\_i$), a constant quantity of symbols (e.g., $C\_i$), and a UE capability for beam report timing (e.g., $X\_i$), which may be referred to as "beamReportTiming". $KB\_i$ may correspond to a minimum time from the end of DCI to the start of an aperiodic AP CSI-RS, in order for the UE to apply a quasi-co-location (QCL) assumption indicated in DCI. Otherwise, the UE may apply a default QCL assumption for receiving an aperiodic CSI-RS. The constant $C\_i$ may be 44 symbols or 97 symbols. $X\_i$ may correspond to a minimum time from the end of an aperiodic CSI-RS to the start of a PUSCH carrying the aperiodic CSI-RS report. The Z3 value may correspond to a minimum of $C\_i$ and ($X\_i + KB\_i$). Index i may be 1 or 2, which may correspond to a subcarrier spacing of 60 kilohertz (kHz) or 120 kHz. The base station may indicate the time duration in DCI that schedules the aperiodic CSI-RS report, which contains L1 metrics, including L1-RSRP and L1-SINR. Z3 may correspond to a minimum quantity of symbols from the end of the PDCCH to the start of PUSCH carrying the aperiodic CSI-RS report, which contains L1 metrics, including L1-RSRP and L1-SINR.

In some aspects, the aperiodic CSI beam switch latency threshold is equal to a UE reported beamSwitchTiming. The parameter beamSwitchTiming may indicate a minimum quantity of symbols (e.g., 14, 28, or 48 symbols) between receipt of DCI that schedules an aperiodic CSI-RS report and transmission of the aperiodic CSI-RS report.

In some aspects, the base station may transmit an aperiodic CSI-RS repetition parameter to the UE. The aperiodic CSI-RS repetition parameter may indicate an aperiodic CSI-RS repetition associated with the aperiodic CSI-RS. In some aspects, the aperiodic CSI-RS repetition parameter may indicate when repetition is set as "ON" for the aperiodic CSI-RS, or the aperiodic CSI-RS repetition parameter may indicate when repetition is set as "OFF" for the aperiodic CSI-RS. In other words, the aperiodic CSI-RS repetition parameter may indicate whether a transmission of the aperiodic CSI-RS is to be repeated by the base station.

In some aspects, the beamSwitchTiming may not be used when a triggered aperiodic CSI-RS is in a CSI-RS resource set configured with repetition "ON," when the UE also reports beamSwitchTiming-r16. In this case, the base station may determine the aperiodic CSI beam switch latency threshold to be equal to beamSwitchTiming-r16 (e.g., 224 or 336 symbols).

Additionally, or alternatively, the aperiodic CSI beam switch latency threshold may be a fixed value (e.g., 48 symbols). The base station may obtain the fixed value from stored configuration information (e.g., according to a standard) and/or may provide the fixed value to the UE.

In a fifth operation 510, the base station may transmit the DCI to the UE over a PDCCH. The DCI may schedule the aperiodic CSI-RS. The DCI may trigger the aperiodic CSI-RS to be transmitted from the base station to the UE at a later time. The DCI may also include the time duration determined by the base station. Additionally, the DCI may indicate a downlink beam to be applied by the UE. For example, the DCI may indicate the downlink beam to be applied by the UE to receive the aperiodic CSI-RS from the base station.

The UE may obtain the time duration from the DCI. In some aspects, the base station and the UE may utilize the same rules for determining a time duration. The base station may transmit a value for the aperiodic CSI beam switch latency threshold to the UE via the DCI, an RRC message, or a MAC CE. The UE may calculate the time duration based at least in part on the received aperiodic CSI beam switch latency threshold. In some aspects, the UE may recommend, to the base station, the aperiodic CSI beam switch latency threshold to use via uplink control information (UCI), an RRC message, or a MAC CE.

In a sixth operation 512, the UE may implement the time duration received in the DCI. In some aspects, determining that the aperiodic CSI beam switch latency threshold is equal to the second beam switch timing value may be based on a determination that an aperiodic CSI-RS scheduled by the DCI is in a CSI-RS resource set configured with repetition. In other words, for aperiodic CSI-RS with the TRS information not configured for the UE and the aperiodic CSI-RS repetition set to "ON", the UE may determine that the beam switch timing value (or an actual applied beam switch latency threshold) corresponds to the second reported beam switch timing value (beamSwitchTiming-r16).

In some aspects, if the UE reports the second beam switch timing value (beamSwitchTiming-r16), the UE may receive a higher layer parameter for enabling beam switch timing (e.g., enableBeamSwitchTiming-r16) from the base station. The higher layer parameter may indicate whether the base station will use beamSwitchTiming-r16 for a time duration. In some aspects, the UE may not receive the higher layer parameter. In some aspects, the UE may signal beamSwitchTiming, but not beamSwitchTiming-r16. Currently, the UE may only signal beamSwitchTiming or signal both beamSwitchTiming and beamSwitchTiming-r16.

In a seventh operation 514, the UE may receive the aperiodic CSI-RS from the base station. The UE may receive the aperiodic CSI-RS in accordance with the beam switch timing value. For example, the UE may receive the aperiodic CSI-RS based at least in part on applying the downlink beam indicated in the DCI in accordance with the beam switch timing value. The aperiodic CSI-RS may be transmitted from the base station to the UE in a CSI-RS resource set. The UE may be operating with consideration of the time duration.

In an eighth operation 516, the UE may generate the aperiodic CSI report. The UE may still operate with consideration of the time duration. In a ninth operation 518, the UE may transmit the aperiodic CSI report. The start of the aperiodic CSI report on the PUSCH may be within or at an end of the time duration. By considering a computation delay associated with different beam switch timing values, the UE and the base station may coordinate aperiodic CSI reports that may have a larger aperiodic CSI beam switch latency threshold.

As indicated above, FIG. 5 is provided as an example. Other examples may differ from what is described with regard to FIG. 5.

Figure 6:
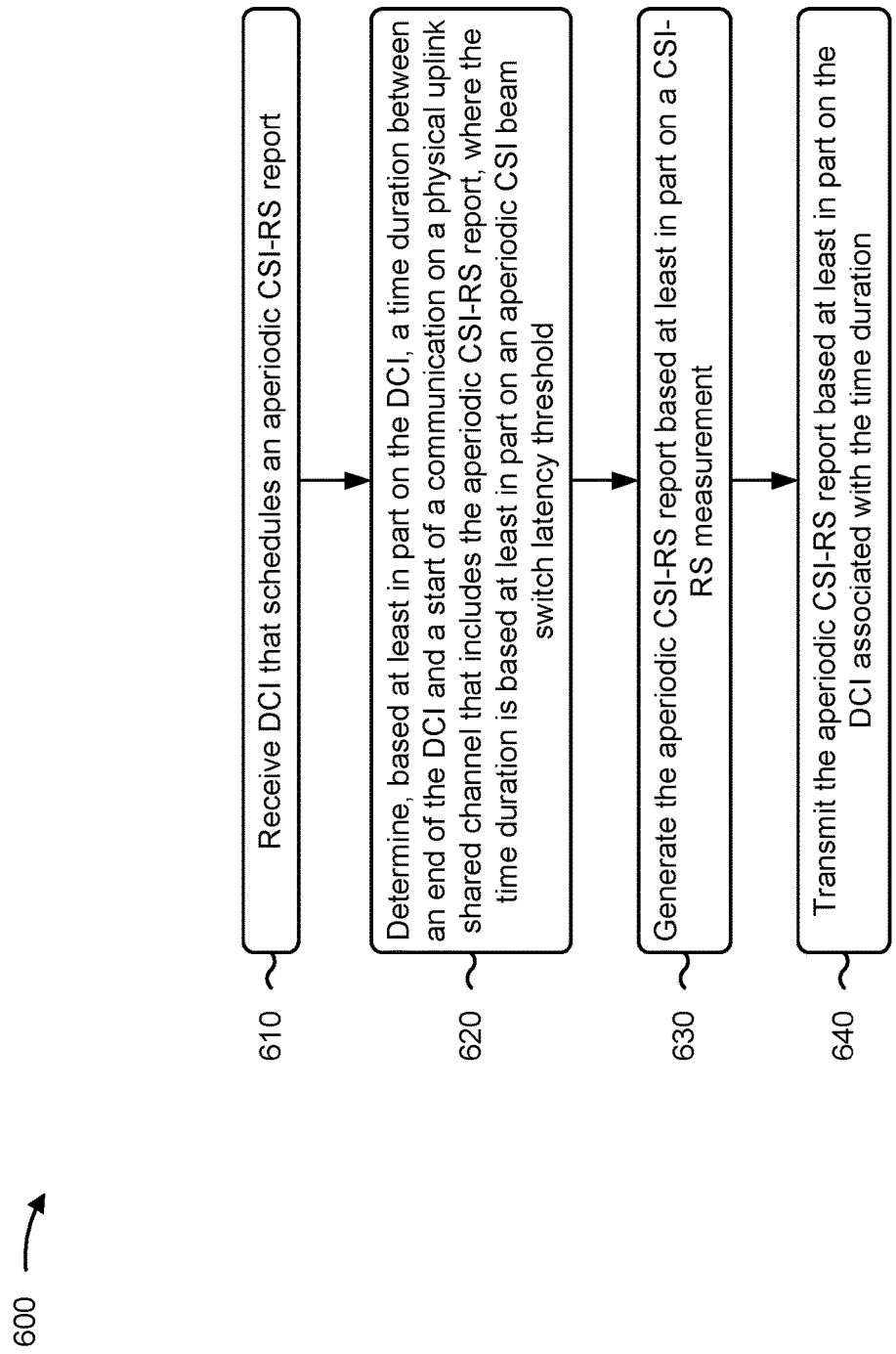
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120 depicted in FIGS. 1-3, the UE in FIGS. 4-5) performs operations associated with considering computation delay for aperiodic CSI beam switching latency.

As shown in FIG. 6, in some aspects, process 600 may include receiving DCI that schedules an aperiodic CSI-RS report (block 610). For example, the UE (e.g., using reception component 802 depicted in FIG. 8) may receive DCI that schedules an aperiodic CSI-RS report, as described above in connection with FIGS. 1-5.

As further shown in FIG. 6, in some aspects, process 600 may include determining, based at least in part on the DCI, a time duration between an end of the DCI and a start of a communication on a PUSCH that includes the aperiodic CSI-RS report (block 620). For example, the UE (e.g., using determination component 808 depicted in FIG. 8) may determine, based at least in part on the DCI, a time duration between an end of the DCI and a start of a communication on a PUSCH that includes the aperiodic CSI-RS report, as described above in connection with FIGS. 1-5. In some aspects, the time duration may be based at least in part on an aperiodic CSI beam switch latency threshold.

As further shown in FIG. 6, in some aspects, process 600 may include generating the aperiodic CSI-RS report based at least in part on a CSI-RS measurement (block 630). For example, the UE (e.g., using generation component 810 depicted in FIG. 8) may generate the aperiodic CSI-RS report based at least in part on a CSI-RS measurement, as described above in connection with FIGS. 1-5.

As further shown in FIG. 6, in some aspects, process 600 may include transmitting the aperiodic CSI-RS report based at least in part on the DCI associated with the time duration (block 640). For example, the UE (e.g., using transmission component 804 depicted in FIG. 8) may transmit the aperiodic CSI-RS report based at least in part on the DCI associated with the time duration, as described above in connection with FIGS. 1-5.

Process 600 may include additional aspects, such as any single aspect or any combination of aspects described below and/or in connection with one or more other processes described elsewhere herein.

In a first aspect, process 600 includes determining that the aperiodic CSI beam switch latency threshold is equal to a first beam switch timing value, after reporting the first beam switch timing value. The first beam switch timing value may be 14, 28, or 48 symbols.

In a second aspect, alone or in combination with the first aspect, process 600 includes, after reporting a first beam switch timing value and a second beam switch timing value, determining that the aperiodic CSI beam switch latency threshold is equal to the second beam switch timing value based on a determination that an aperiodic CSI-RS scheduled by the DCI is in a CSI-RS resource set configured with repetition.

In a third aspect, alone or in combination with one or more of the first and second aspects, the first beam switch timing value is 14, 28, or 48 symbols.

In a fourth aspect, alone or in combination with one or more of the first through third aspects, the second beam switch timing value is 224 symbols or 336 symbols.

In a fifth aspect, alone or in combination with one or more of the first through fourth aspects, process 600 includes determining that the aperiodic CSI beam switch latency threshold is equal to a first beam switch timing value, after reporting the first beam switch timing value.

In a sixth aspect, alone or in combination with one or more of the first through fifth aspects, the first beam switch timing value is 224 or 336 symbols.

In a seventh aspect, alone or in combination with one or more of the first through sixth aspects, process 600 includes determining the aperiodic CSI beam switch latency threshold from stored configuration information.

In an eighth aspect, alone or in combination with one or more of the first through seventh aspects, process 600 includes receiving the aperiodic CSI beam switch latency threshold via an RRC message, a MAC CE, or DCI.

In a ninth aspect, alone or in combination with one or more of the first through eighth aspects, process 600 includes transmitting a recommended aperiodic CSI beam switch latency threshold via an RRC message, a MAC CE, or UCI.

In a tenth aspect, alone or in combination with one or more of the first through ninth aspects, process 600 includes receiving, from a base station, a higher layer parameter for enabling beam switch timing, where the beam switch timing value is 224 or 336 symbols, and transmitting a beam switch timing value to the base station, where the higher layer parameter indicates whether the base station is using the beam switch timing value.

In an eleventh aspect, alone or in combination with one or more of the first through tenth aspects, process 600 includes transmitting a beam switch timing value to a base station, where the beam switch timing value is 224 or 336 symbols, and determining that a higher layer parameter for enabling beam switch timing has not been received from the base station, where the higher layer parameter indicates whether the base station is using the beam switch timing value.

In a twelfth aspect, alone or in combination with one or more of the first through eleventh aspects, process 600 includes transmitting a first beam switch timing value, where the first beam switch timing value is 14, 28, or 48 symbols, and refraining from transmitting a second beam switch timing value, where the second beam switch timing value is 224 or 336 symbols.

In a thirteenth aspect, alone or in combination with one or more of the first through twelfth aspects, the time duration is further based at least in part on a specified quantity of symbols and a UE capability for beam report timing.

In a fourteenth aspect, alone or in combination with one or more of the first through thirteenth aspects, the time duration includes a Z3 computation delay.

In a fifteenth aspect, alone or in combination with one or more of the first through fourteenth aspects, the aperiodic CSI report includes one or more of Layer 1 (L1) metrics, an L1 RSRP, or an L1 signal to interference plus noise ratio (SINR).

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
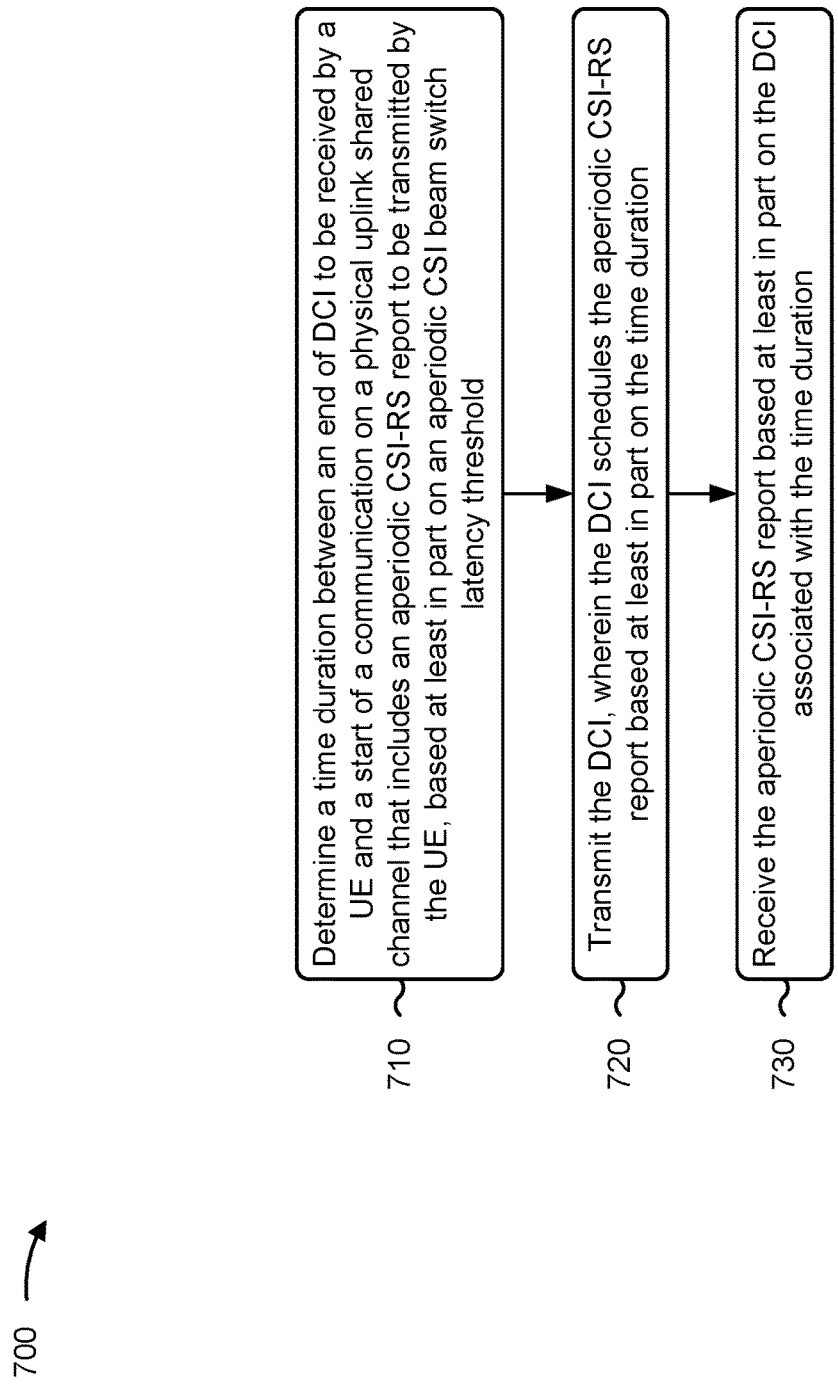
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where the base station (e.g., base station 110 depicted in FIGS. 1-3, the base station depicted in FIGS. 4-5) performs operations associated with considering computation delay for aperiodic CSI beam switching latency.

As shown in FIG. 7, in some aspects, process 700 may include determining a time duration between an end of DCI to be received by a UE and a start of a communication on a PUSCH that includes an aperiodic CSI-RS report to be transmitted by the UE, based at least in part on an aperiodic CSI beam switch latency threshold (block 710). For example, the base station (e.g., using determination component 908 depicted in FIG. 9) may determine a time duration between an end of DCI to be received by a UE and a start of a communication on a PUSCH that includes an aperiodic CSI-RS report to be transmitted by the UE, based at least in part on an aperiodic CSI beam switch latency threshold, as described above in connection with FIGS. 1-5.

As further shown in FIG. 7, in some aspects, process 700 may include transmitting the DCI, wherein the DCI schedules the aperiodic CSI-RS report based at least in part on the time duration (block 720). For example, the base station (e.g., using transmission component 904 depicted in FIG. 9) may transmit the DCI, where the DCI schedules the aperiodic CSI-RS report based at least in part on the time duration, as described above in connection with FIGS. 1-5.

As further shown in FIG. 7, in some aspects, process 700 may include receiving the aperiodic CSI-RS report based at least in part on the DCI associated with the time duration (block 730). For example, the base station (e.g., using reception component 902 depicted in FIG. 9) may receive the aperiodic CSI-RS report based at least in part on the DCI associated with the time duration, as described above in connection with FIGS. 1-5.

Process 700 may include additional aspects, such as any single aspect or any combination of aspects described below and/or in connection with one or more other processes described elsewhere herein.

In a first aspect, process 700 includes receiving a first beam switch timing value, wherein the aperiodic CSI beam switch latency threshold is equal to the first beam switch timing value.

In a second aspect, alone or in combination with the first aspect, the first beam switch timing value is 14, 28, or 48 symbols.

In a third aspect, alone or in combination with one or more of the first and second aspects, process 700 includes receiving a first beam switch timing value and a second beam switch timing value, where the aperiodic CSI beam switch latency threshold is equal to the second beam switch timing value, based on scheduling an aperiodic CSI-RS in a CSI-RS resource set configured with repetition.

In a fourth aspect, in combination with the third aspect, the first beam switch timing value is 14, 28, or 48 symbols.

In a fifth aspect, alone or in combination with one or more of the first through fourth aspects, the second beam switch timing value is 224 or 336 symbols.

In a sixth aspect, alone or in combination with one or more of the first through fifth aspects, the aperiodic CSI beam switch latency threshold is equal to a first beam switch timing value after the UE has reported the first beam switch timing value.

In a seventh aspect, alone or in combination with one or more of the first through sixth aspects, the first beam switch timing value is 224 or 336 symbols.

In an eighth aspect, alone or in combination with one or more of the first through seventh aspects, process 700 includes transmitting the aperiodic CSI beam switch latency threshold to the UE via an RRC message, a MAC CE, or DCI.

In a ninth aspect, alone or in combination with one or more of the first through eighth aspects, process 700 includes receiving a recommended aperiodic CSI beam switch latency threshold on an RRC message, a MAC CE, or UCI.

In a tenth aspect, alone or in combination with one or more of the first through ninth aspects, process 700 includes transmitting a higher layer parameter for enabling beam switch timing after receiving a beam switch timing value from the UE, where the beam switch timing value is 224 or 336 symbols, and where the higher layer parameter indicates whether the base station is using the beam switch timing value.

In an eleventh aspect, alone or in combination with one or more of the first through tenth aspects, process 700 includes refraining from transmitting a higher layer parameter for enabling beam switch timing after receiving a beam switch timing value from the UE, where the beam switch timing value is 224 or 336 symbols.

In a twelfth aspect, alone or in combination with one or more of the first through eleventh aspects, process 700 includes receiving, from the UE, a first beam switch timing value, where the first beam switch timing value is 14, 28, or 48 symbols, and not receiving a second beam switch timing value, where the second beam switch timing value is 224 or 336 symbols.

In a thirteenth aspect, alone or in combination with one or more of the first through twelfth aspects, the time duration is further based at least in part on a specified quantity of symbols and a UE capability for beam report timing.

In a fourteenth aspect, alone or in combination with one or more of the first through thirteenth aspects, the time duration includes a Z3 computation delay.

In a fifteenth aspect, alone or in combination with one or more of the first through fourteenth aspects, the aperiodic CSI report includes one or more of L1 metrics, an L1 RSRP, or an L1 SINR.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
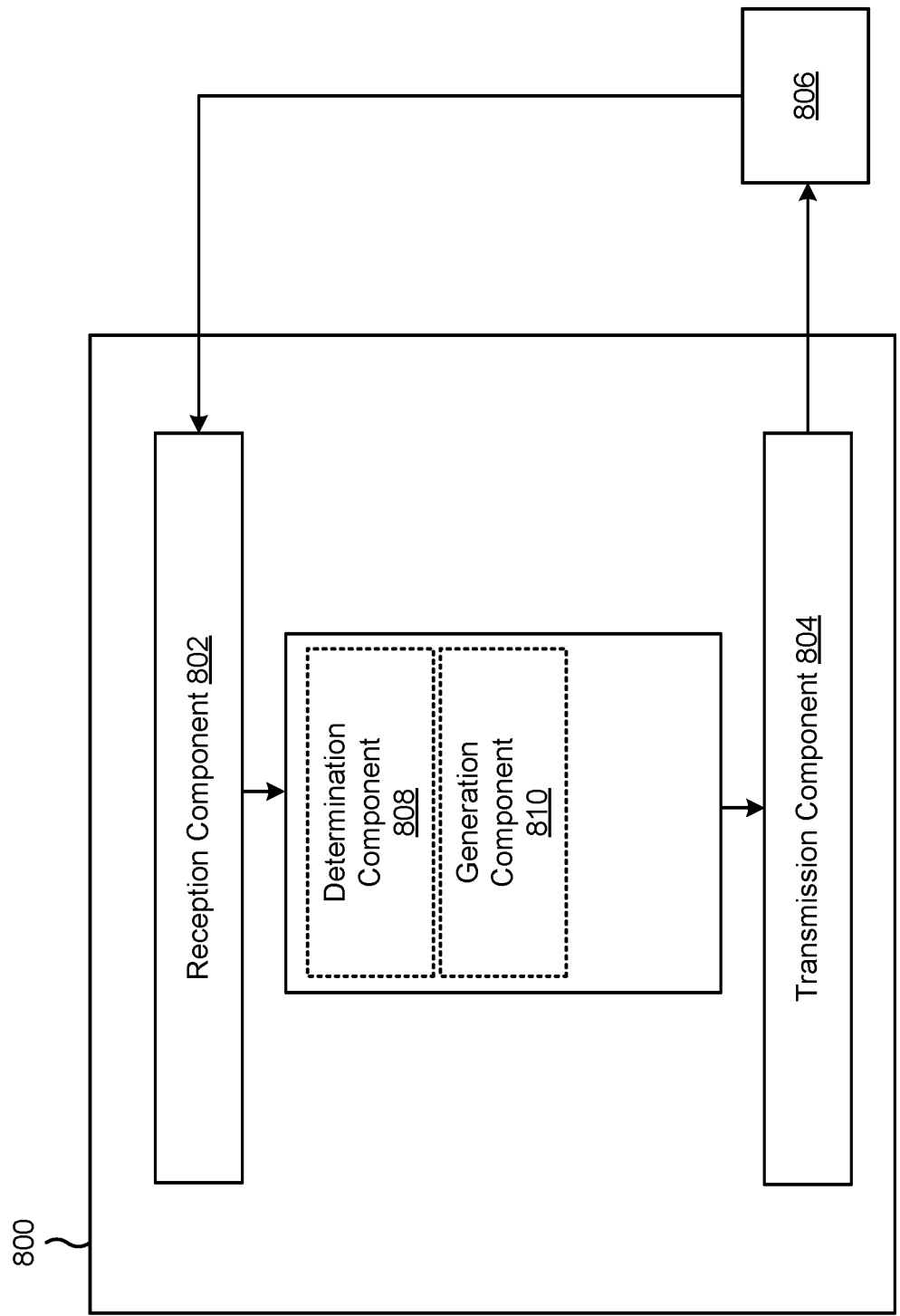
FIGS. 8-9 are block diagrams of example apparatuses for wireless communication, in accordance with the present disclosure.

FIG. 8 is a block diagram of an example apparatus 800 for wireless communication, in accordance with the present disclosure. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808 and/or a generation component 810, among other examples.

In some aspects, the apparatus 800 may be configured to perform one or more operations described herein in connection with FIGS. 1-5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The reception component 802 may receive DCI that schedules an aperiodic CSI-RS report. The determination component 808 may determine, based at least in part on the DCI, a time duration between an end of the DCI and a start of a communication on a PUSCH that includes the aperiodic CSI-RS report, where the time duration is based at least in part on an aperiodic CSI beam switch latency threshold. The generation component 810 may generate the aperiodic CSI-RS report based at least in part on a CSI-RS measurement. The transmission component 804 may transmit the aperiodic CSI-RS report based at least in part on the DCI associated with the time duration.

The determination component 808 may determine that the aperiodic CSI beam switch latency threshold is equal to a first beam switch timing value, after reporting the first beam switch timing value. The determination component 808 may determine that the aperiodic CSI beam switch latency threshold is equal to a first beam switch timing value, after reporting the first beam switch timing value. The determination component 808 may determine the aperiodic CSI beam switch latency threshold from stored configuration information.

The reception component 802 may receive the aperiodic CSI beam switch latency threshold via an RRC message, a MAC CE, or DCI. The transmission component 804 may transmit a recommended aperiodic CSI beam switch latency threshold. The reception component 802 may receive, from a base station, a higher layer parameter for enabling beam switch timing, where the beam switch timing value is 224 or 336 symbols.

The transmission component 804 may transmit a beam switch timing value to the base station, where the higher layer parameter indicates whether the base station is using the beam switch timing value. The transmission component 804 may transmit a beam switch timing value to a base station, where the beam switch timing value is 224 or 336 symbols.

The determination component 808 may determine that a higher layer parameter for enabling beam switch timing has not been received from the base station, where the higher layer parameter indicates whether the base station is using the beam switch timing value.

The transmission component 804 may transmit a first beam switch timing value, where the first beam switch timing value is 14, 28, or 48 symbols, and refrain from transmitting a second beam switch timing value, where the second beam switch timing value is 224 or 336 symbols.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
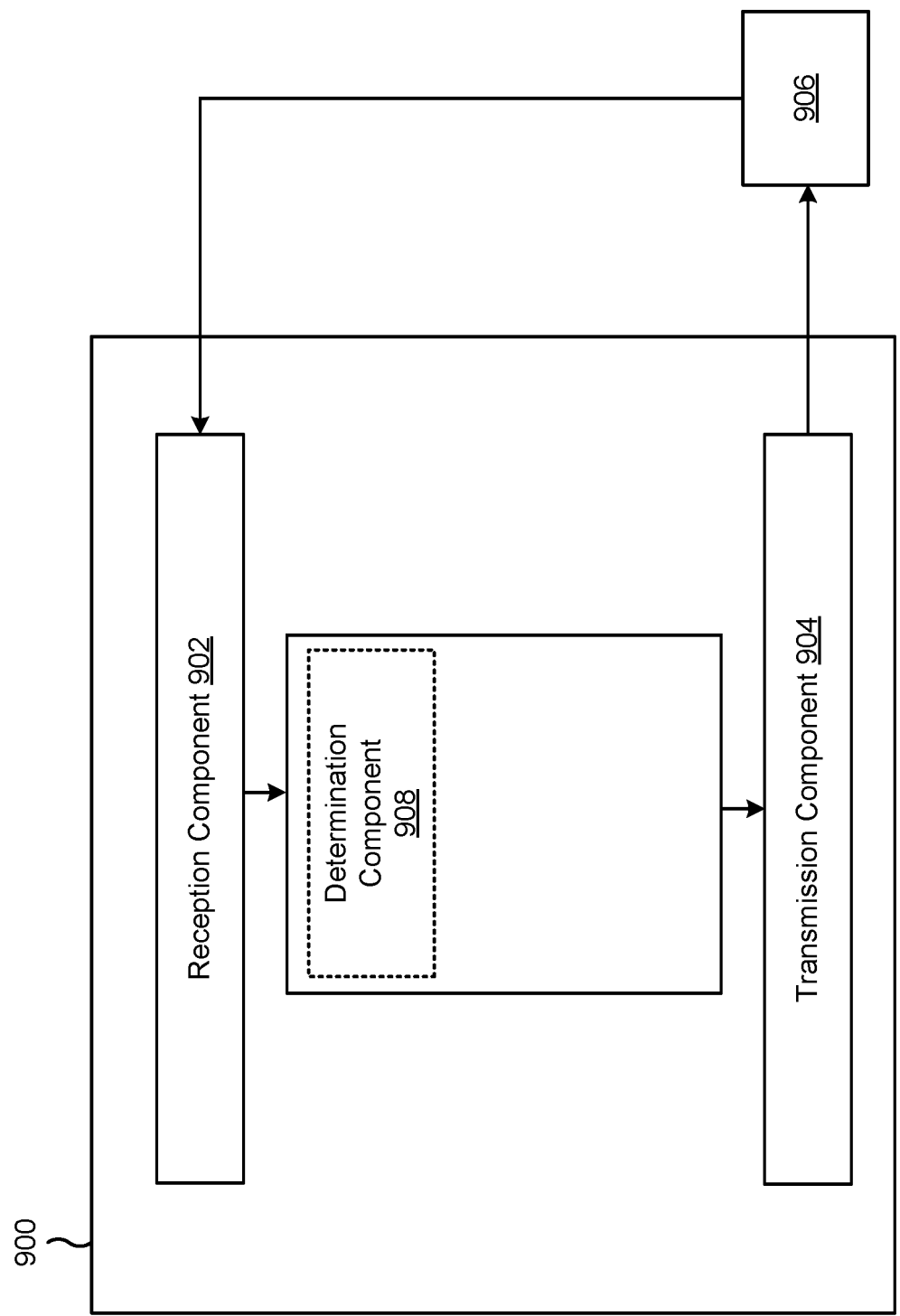

FIG. 9 is a block diagram of an example apparatus 900 for wireless communication, in accordance with the present disclosure. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908, among other examples.

In some aspects, the apparatus 900 may be configured to perform one or more operations described herein in connection with FIGS. 1-5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The determination component 908 may determine a time duration between an end of DCI to be received by a UE and a start of a communication on a PUSCH that includes an aperiodic CSI-RS report to be transmitted by the UE, based at least in part on an aperiodic CSI beam switch latency threshold. The transmission component 904 may transmit the DCI, where the DCI schedules the aperiodic CSI-RS report based at least in part on the time duration. The reception component 902 may receive the aperiodic CSI-RS report based at least in part on the DCI associated with the time duration.

The reception component 902 may receive a first beam switch timing value, where the aperiodic CSI beam switch latency threshold is equal to the first beam switch timing value. The reception component 902 may receive a first beam switch timing value and a second beam switch timing value, where the aperiodic CSI beam switch latency threshold is equal to the second beam switch timing value, based on scheduling an aperiodic CSI-RS in a CSI-RS resource set configured with repetition.

The transmission component 904 may transmit the aperiodic CSI beam switch latency threshold to the UE via an RRC message, a MAC CE, or DCI. The transmission component 904 may transmit a recommended aperiodic CSI beam switch latency threshold.

The transmission component 904 may transmit a higher layer parameter for enabling beam switch timing after receiving a beam switch timing value from the UE, where the beam switch timing value is 224 or 336 symbols, and where the higher layer parameter indicates whether the base station is using the beam switch timing value. The transmission component 904 may refrain from transmitting a higher layer parameter for enabling beam switch timing after receiving a beam switch timing value from the UE, where the beam switch timing value is 224 or 336 symbols.

The reception component 902 may receive, from the UE, a first beam switch timing value, where the first beam switch timing value is 14, 28, or 48 symbols, and not receive a second beam switch timing value, where the second beam switch timing value is 224 or 336 symbols.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving downlink control information (DCI) that schedules an aperiodic channel state information reference signal (CSI-RS) report; determining, based at least in part on the DCI, a time duration between an end of the DCI and a start of a communication on a physical uplink shared channel that includes the aperiodic CSI-RS report, wherein the time duration is based at least in part on an aperiodic CSI beam switch latency threshold; generating the aperiodic CSI-RS report based at least in part on a CSI-RS measurement; and transmitting the aperiodic CSI-RS report based at least in part on the DCI associated with the time duration.

Aspect 2: The method of Aspect 1, further comprising determining that the aperiodic CSI beam switch latency threshold is equal to a first beam switch timing value, after reporting the first beam switch timing value.

Aspect 3: The method of Aspect 2, wherein the first beam switch timing value is 14, 28, or 48 symbols.

Aspect 4: The method of any of Aspects 1-3, further comprising, after reporting a first beam switch timing value and a second beam switch timing value, determining that the aperiodic CSI beam switch latency threshold is equal to the second beam switch timing value based on a determination that an aperiodic CSI-RS scheduled by the DCI is in a CSI-RS resource set configured with repetition.

Aspect 5: The method of Aspect 4, wherein the first beam switch timing value is 14, 28, or 48 symbols.

Aspect 6: The method of Aspect 4, wherein the second beam switch timing value is 224 symbols or 336 symbols.

Aspect 7: The method of any of Aspects 1-6, further comprising determining that the aperiodic CSI beam switch latency threshold is equal to a first beam switch timing value, after reporting the first beam switch timing value.

Aspect 8: The method of Aspect 7, wherein the first beam switch timing value is 224 or 336 symbols.

Aspect 9: The method of any of Aspects 1-8, further comprising determining the aperiodic CSI beam switch latency threshold from stored configuration information.

Aspect 10: The method of any of Aspects 1-9, further comprising receiving the aperiodic CSI beam switch latency threshold via a radio resource control message, a medium access control control element, or DCI.

Aspect 11: The method of any of Aspects 1-10, further comprising transmitting a recommended aperiodic CSI beam switch latency threshold via a radio resource control message, a medium access control control element, or uplink control information.

Aspect 12: The method of any of Aspects 1-11, further comprising: receiving, from a base station, a higher layer parameter for enabling beam switch timing, wherein the beam switch timing value is 224 or 336 symbols; and transmitting a beam switch timing value to the base station, wherein the higher layer parameter indicates whether the base station is using the beam switch timing value.

Aspect 13: The method of any of Aspects 1-11, further comprising: transmitting a beam switch timing value to a base station, wherein the beam switch timing value is 224 or 336 symbols; and determining that a higher layer parameter for enabling beam switch timing has not been received from the base station, wherein the higher layer parameter indicates whether the base station is using the beam switch timing value.

Aspect 14: The method of any of Aspects 1-13, further comprising transmitting a first beam switch timing value, wherein the first beam switch timing value is 14, 28, or 48 symbols, and refraining from transmitting a second beam switch timing value, wherein the second beam switch timing value is 224 or 336 symbols.

Aspect 15: The method of any of Aspects 1-14, wherein the time duration is further based at least in part on a specified quantity of symbols and a UE capability for beam report timing.

Aspect 16: The method of any of Aspects 1-15, wherein the time duration includes a Z3 computation delay.

Aspect 17: The method of any of Aspects 1-16, wherein the aperiodic CSI report includes one or more of Layer 1 metrics, a Layer 1 reference signal received power, or a Layer 1 signal to interference plus noise ratio.

Aspect 18: A method of wireless communication performed by a base station, comprising: determining a time duration between an end of downlink control information (DCI) to be received by a user equipment (UE) and a start of a communication on a physical uplink shared channel that includes an aperiodic channel state information reference signal (CSI-RS) report to be transmitted by the UE, based at least in part on an aperiodic CSI beam switch latency threshold; transmitting the DCI, wherein the DCI schedules the aperiodic CSI-RS report based at least in part on the time duration; and receiving the aperiodic CSI-RS report based at least in part on the DCI associated with the time duration.

Aspect 19: The method of Aspect 18, further comprising receiving a first beam switch timing value, wherein the aperiodic CSI beam switch latency threshold is equal to the first beam switch timing value.

Aspect 20: The method of Aspect 19, wherein the first beam switch timing value is 14, 28, or 48 symbols.

Aspect 21: The method of Aspect 18, further comprising receiving a first beam switch timing value and a second beam switch timing value, wherein the aperiodic CSI beam switch latency threshold is equal to the second beam switch timing value based on scheduling an aperiodic CSI-RS in a CSI-RS resource set configured with repetition.

Aspect 22: The method of Aspect 21, wherein the first beam switch timing value is 14, 28, or 48 symbols.

Aspect 23: The method of Aspect 21, wherein the second beam switch timing value is 224 or 336 symbols.

Aspect 24: The method of any of Aspects 18-23, wherein the aperiodic CSI beam switch latency threshold is equal to a first beam switch timing value after the UE has reported the first beam switch timing value.

Aspect 25: The method of Aspect 24, wherein the first beam switch timing value is 224 or 336 symbols.

Aspect 26: The method of any of Aspects 18-25, further comprising transmitting the aperiodic CSI beam switch latency threshold to the UE via a radio resource control message, a medium access control control element, or DCI.

Aspect 27: The method of any of Aspects 18-27, further comprising receiving a recommended aperiodic CSI beam switch latency threshold on a radio resource control message, a medium access control control element, or uplink control information.

Aspect 28: The method of any of Aspects 18-27, further comprising transmitting a higher layer parameter for enabling beam switch timing after receiving a beam switch timing value from the UE, wherein the beam switch timing value is 224 or 336 symbols, and wherein the higher layer parameter indicates whether the base station is using the beam switch timing value.

Aspect 29: The method of any of Aspects 18-27, further comprising refraining from transmitting a higher layer parameter for enabling beam switch timing after receiving a beam switch timing value from the UE, wherein the beam switch timing value is 224 or 336 symbols.

Aspect 30: The method of any of Aspects 18-29, further comprising receiving, from the UE, a first beam switch timing value, wherein the first beam switch timing value is 14, 28, or 48 symbols, and not receiving a second beam switch timing value, wherein the second beam switch timing value is 224 or 336 symbols.

Aspect 31: The method of any of Aspects 18-30, wherein the time duration is further based at least in part on a specified quantity of symbols and a UE capability for beam report timing.

Aspect 32: The method of any of Aspects 18-31, wherein the time duration includes a Z3 computation delay.

Aspect 33: The method of any of Aspects 18-32, wherein the aperiodic CSI report includes one or more of Layer 1 metrics, a Layer 1 reference signal received power, or a Layer 1 signal to interference plus noise ratio.

Aspect 34: An apparatus for wireless communication at a device, comprising a processor; memory coupled with the processor; and instructions stored in the memory and executable by the processor to cause the apparatus to perform the method of one or more of Aspects 1-33.

Aspect 35: A device for wireless communication, comprising a memory and one or more processors coupled to the memory, the one or more processors configured to perform the method of one or more of Aspects 1-33.

Aspect 36: An apparatus for wireless communication, comprising at least one means for performing the method of one or more of Aspects 1-33.

Aspect 37: A non-transitory computer-readable medium storing code for wireless communication, the code comprising instructions executable by a processor to perform the method of one or more of Aspects 1-33.

Aspect 38: A non-transitory computer-readable medium storing a set of instructions for wireless communication, the set of instructions comprising one or more instructions that, when executed by one or more processors of a device, cause the device to perform the method of one or more of Aspects 1-33.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   memory; and
   one or more processors, coupled to the memory, configured to:
      receive downlink control information (DCI) that schedules an aperiodic channel state information (CSI) reference signal (CSI-RS) report;
      determine, based at least in part on the DCI, a time duration between an end of the DCI and a start of a communication on a physical uplink shared channel that includes the aperiodic CSI-RS report, wherein the time duration is a Z3 CSI computational delay that is based at least in part on an aperiodic CSI beam switch latency threshold indicating a quantity of symbols, a UE capability for beam report timing, and an additional quantity of symbols;
      generate the aperiodic CSI-RS report based at least in part on a CSI-RS measurement; and
      transmit the aperiodic CSI-RS report based at least in part on the DCI associated with the time duration.

2. The UE of claim 1, wherein the one or more processors are configured to determine that the aperiodic CSI beam switch latency threshold is equal to a first beam switch timing value, after reporting the first beam switch timing value.

3. The UE of claim 2, wherein the first beam switch timing value is 14, 28, or 48 symbols.

4. The UE of claim 2, wherein the first beam switch timing value is 224 or 336 symbols.

5. The UE of claim 1, wherein the one or more processors are configured to, after reporting a first beam switch timing value and a second beam switch timing value, determine that the aperiodic CSI beam switch latency threshold is equal to the second beam switch timing value based on a determination that an aperiodic CSI-RS scheduled by the DCI is in a CSI-RS resource set configured with repetition.

6. The UE of claim 5, wherein the first beam switch timing value is 14, 28, or 48 symbols, and wherein the second beam switch timing value is 224 symbols or 336 symbols.

7. The UE of claim 1, wherein the one or more processors are configured to determine the aperiodic CSI beam switch latency threshold from stored configuration information or receive the aperiodic CSI beam switch latency threshold via a radio resource control message, a medium access control control element (MAC CE), or DCI.

8. The UE of claim 1, wherein the one or more processors are configured to transmit a recommended aperiodic CSI beam switch latency threshold via a radio resource control message, a medium access control control element (MAC CE), or uplink control information.

9. The UE of claim 1, wherein the one or more processors are configured to:
   receive, from a base station, a higher layer parameter for enabling beam switch timing, wherein a beam switch timing value is 224 or 336 symbols; and
   transmit the beam switch timing value to the base station, wherein the higher layer parameter indicates whether the base station is using the beam switch timing value.

10. The UE of claim 1, wherein the one or more processors are configured to:
    transmit a beam switch timing value to a base station, wherein the beam switch timing value is 224 or 336 symbols; and
    determine that a higher layer parameter for enabling beam switch timing has not been received from the base station, wherein the higher layer parameter indicates whether the base station is using the beam switch timing value.

11. The UE of claim 1, wherein the one or more processors are configured to:
    transmit a first beam switch timing value, wherein the first beam switch timing value is 14, 28, or 48 symbols; and
    refrain from transmitting a second beam switch timing value, wherein the second beam switch timing value is 224 or 336 symbols.

12. The UE of claim 1, wherein the aperiodic CSI report includes one or more of Layer 1 metrics, a Layer 1 reference signal received power, or a Layer 1 signal to interference plus noise ratio.

13. A network entity for wireless communication, comprising:
    memory; and
    one or more processors, coupled to the memory, configured to:
       determine a time duration between an end of downlink control information (DCI) to be received by a user equipment (UE) and a start of a communication on a physical uplink shared channel that includes an aperiodic channel state information (CSI) reference signal (CSI-RS) report to be transmitted by the UE, wherein the time duration is a Z3 CSI computational delay that is based at least in part on an aperiodic CSI beam switch latency threshold indicating a quantity of symbols, a UE capability for beam report timing, and an additional quantity of symbols;
transmit the DCI, wherein the DCI schedules the aperiodic CSI-RS report based at least in part on the time duration; and
receive the aperiodic CSI-RS report based at least in part on the DCI associated with the time duration.

14. The network entity of claim 13, wherein the one or more processors are configured to receive a first beam switch timing value, wherein the aperiodic CSI beam switch latency threshold is equal to the first beam switch timing value.

15. The network entity of claim 14, wherein the first beam switch timing value is 14, 28, or 48 symbols.

16. The network entity of claim 13, wherein the one or more processors are configured to receive a first beam switch timing value and a second beam switch timing value, wherein the aperiodic CSI beam switch latency threshold is equal to the second beam switch timing value based on scheduling an aperiodic CSI-RS in a CSI-RS resource set configured with repetition.

17. The network entity of claim 16, wherein the first beam switch timing value is 14, 28, or 48 symbols.

18. The network entity of claim 16, wherein the second beam switch timing value is 224 or 336 symbols.

19. The network entity of claim 13, wherein the aperiodic CSI beam switch latency threshold is equal to a first beam switch timing value after the UE has reported the first beam switch timing value, and wherein the first beam switch timing value is 224 or 336 symbols.

20. The network entity of claim 13, wherein the one or more processors are configured to transmit the aperiodic CSI beam switch latency threshold to the UE via a radio resource control message, a medium access control control element (MAC CE), or DCI.

21. The network entity of claim 13, wherein the one or more processors are configured to receive a recommended aperiodic CSI beam switch latency threshold on a radio resource control message, a medium access control control element (MAC CE), or uplink control information.

22. The network entity of claim 13, wherein the one or more processors are configured to transmit a higher layer parameter for enabling beam switch timing after receiving a beam switch timing value from the UE, wherein the beam switch timing value is 224 or 336 symbols, and wherein the higher layer parameter indicates whether the network entity is using the beam switch timing value.

23. The network entity of claim 13, wherein the one or more processors are configured to refrain from transmitting a higher layer parameter for enabling beam switch timing after receiving a beam switch timing value from the UE, wherein the beam switch timing value is 224 or 336 symbols.

24. The network entity of claim 13, wherein the one or more processors are configured to receive, from the UE, a first beam switch timing value, wherein the first beam switch timing value is 14, 28, or 48 symbols, and not receive a second beam switch timing value, wherein the second beam switch timing value is 224 or 336 symbols.

25. A method of wireless communication performed by a user equipment (UE), comprising:
receiving downlink control information (DCI) that schedules an aperiodic channel state information (CSI) reference signal (CSI-RS) report;
determining, based at least in part on the DCI, a time duration between an end of the DCI and a start of a communication on a physical uplink shared channel that includes the aperiodic CSI-RS report, wherein the time duration is a Z3 CSI computational delay that is based at least in part on an aperiodic CSI beam switch latency threshold indicating a quantity of symbols, a UE capability for beam report timing, and an additional quantity of symbols;
generating the aperiodic CSI-RS report based at least in part on a CSI-RS measurement; and
transmitting the aperiodic CSI-RS report based at least in part on the DCI associated with the time duration.

26. The method of claim 25, further comprising:
determining that the aperiodic CSI beam switch latency threshold is equal to a first beam switch timing value, after reporting the first beam switch timing value.

27. The method of claim 25, further comprising:
determining, after reporting a first beam switch timing value and a second beam switch timing value, that the aperiodic CSI beam switch latency threshold is equal to the second beam switch timing value based on a determination that an aperiodic CSI-RS scheduled by the DCI is in a CSI-RS resource set configured with repetition.

28. A method of wireless communication performed by a network entity, comprising:
determining a time duration between an end of downlink control information (DCI) to be received by a user equipment (UE) and a start of a communication on a physical uplink shared channel that includes an aperiodic channel state information (CSI) reference signal (CSI-RS) report to be transmitted by the UE, wherein the time duration is a Z3 CSI computational delay that is based at least in part on an aperiodic CSI beam switch latency threshold indicating a quantity of symbols, a UE capability for beam report timing, and an additional quantity of symbols;
transmitting the DCI, wherein the DCI schedules the aperiodic CSI-RS report based at least in part on the time duration; and
receiving the aperiodic CSI-RS report based at least in part on the DCI associated with the time duration.

29. The method of claim 28, further comprising:
receiving a first beam switch timing value, wherein the aperiodic CSI beam switch latency threshold is equal to the first beam switch timing value.

30. The method of claim 28, further comprising:
receiving a first beam switch timing value and a second beam switch timing value, wherein the aperiodic CSI beam switch latency threshold is equal to the second beam switch timing value based on scheduling an aperiodic CSI-RS in a CSI-RS resource set configured with repetition.

* * * * *